United States Patent [19]

Smith

[11] Patent Number: 4,562,232

[45] Date of Patent: Dec. 31, 1985

[54] COPOLYETHERESTER-DIMER ESTER-BLOCK COPOLYMERS

[75] Inventor: Gary F. Smith, Pittsfield, Mass.

[73] Assignee: General Electric Company, Pittsfield, Mass.

[21] Appl. No.: 685,378

[22] Filed: Dec. 24, 1984

[51] Int. Cl.$^4$ .............................................. C08G 63/76
[52] U.S. Cl. ............................... 525/444.5; 528/295.3
[58] Field of Search ................... 525/444.5; 528/295.3

[56] References Cited

U.S. PATENT DOCUMENTS

| | | | |
|---|---|---|---|
| 3,975,323 | 8/1976 | Georgoudis et al. | 260/22 D |
| 4,155,889 | 5/1979 | Fagerburg et al. | 528/295.3 X |
| 4,195,000 | 3/1980 | Charles et al. | 260/22 D |
| 4,216,129 | 8/1980 | Davis et al. | 260/22 D |
| 4,251,652 | 2/1981 | Tanaka et al. | 528/279 |
| 4,264,761 | 4/1981 | McGirk | 528/300 |
| 4,383,106 | 5/1983 | Tung | 528/295.3 |
| 4,390,687 | 6/1983 | Tung | 528/295 |
| 4,439,598 | 3/1984 | Sublett et al. | 528/295.3 |
| 4,452,965 | 6/1984 | Tung | 528/173 |

*Primary Examiner*—Lucille M. Phynes
*Attorney, Agent, or Firm*—Edward K. Welch, II; William F. Mufatti; John W. Harbour

[57] ABSTRACT

Improved copolyether ester elastomers having excellent melt and crystallization temperatures as well as improved compression set as compared to prior art copolyetheresters are prepared by incorporating therein dimer ester polymer blocks.

20 Claims, No Drawings

COPOLYETHERESTER-DIMER ESTER-BLOCK COPOLYMERS

The present invention relates to elastomeric thermoplastic block copolymers derived from polyester blocks, poly(alkylene ether) blocks and dimer ester blocks having greatly improved compression set and melting and crystallization characteristics as compared to random copolyetheresters having incorporated therein dimer acid.

Copolyetherester elastomers are well known. Generally, they are prepared by conventional esterification/condensation processes for the preparation of polyesters from diols, dicarboxylic acids and poly(alkylene ether) glycols of molecular weight of from 350–6000. Such copolyetheresters and their methods of production are described in, for example, U.S. Pat. Nos. 3,023,123; 3,763,109; 3,651,014; 3,766,146 and 3,663,653 and are available from a number of sources commercially including E.I. duPont under the trademark Hytrel.

It is likewise known to prepare segmented copolyester elastomers from low molecular weight diols, dicarboxylic acid and dimer acid, see e.g. Hoeschele, U.S. Pat. No. 3,954,689. Additionally, it is known to make copolyetherester elastomers, such as described above, wherein some of the dicarboxylic acid and/or poly(alkylene ether)glycol is substituted by dimer acid. For example, Tung (U.S. Pat. No. 4,254,001) describes random copolyesters derived from terephthalic acid, dimer acid, butanediol and poly(tetramethylene ether)glycol having good elastomeric characteristics which can be used to make films, fibers and molded parts. Finally, McGirk (U.S. Pat. No. 4,264,761) describes random copolyetheresters suitable as barrier coats having incorporated therein dimer acid.

While the foregoing dimer modified copolyesters and copolyetheresters have good elastomeric properties, their use may be somewhat limited by their low crystallization and melt temperatures and average compression set properties as compared to unmodified copolyetheresters. Alternatively, while the unmodified copolyetheresters have the good melt and crystallization properties, certain elastomeric properties as well as stability characteristics are not as good as with the dimer modified compositions.

It is an object of the present invention to provide thermoplastic elastomeric compositions having excellent crystallization and melt temperatures and characteristics as well as superior compression set as compared to either dimer modified and unmodified random copolyetheresters.

SUMMARY OF THE INVENTION

The improved thermoplastic elastomeric block copolymers of the present invention may be prepared by conventional esterification/transesterification processes from (a) an aromatic polyester, (b) a poly(alkylene ether)glycol having a molecular weight of from about 350 to about 12000, and (c) a property improving amount of a long chain aliphatic polyester based on dimer acid. The aromatic polyester (a) may be prepared in a separate step prior to polymerization or it can be prepared during the polymerization. Similarly, any combination of the reactants (a), (b) or (c) may be prereacted in a separate prepolymerization step prior to final polymerization of the polymers of the present invention.

In general, the block copolymers of the present invention comprise from about 40 to about 90, preferably from about 60 to about 80, parts by weight aromatic polyester blocks (a); from about 5 to about 60, preferably from about 15 to about 40, parts by weight of poly(alkylene ether)glycol blocks (b) and from about 2 to about 30, preferably from about 5 to about 15 parts by weight of dimer ester polymer or oligomer blocks. These compositions may contain and preferably do contain stabilizers and the like.

DETAILED DESCRIPTION

The aromatic polyesters (a) are prepared by conventional esterification processes from (i) one or more diols and (ii) one or more aromatic dicarboxylic acids.

Diols which are suitable for use in preparing the aromatic polyester blocks are saturated and/or unsaturated aliphatic, cycloaliphatic, and aromatic dihydroxy compounds. They will preferably have a molecular weight of about 300 or less. Preferred are diols with 2–20 carbon atoms such as ethylene, propylene, tetramethylene, pentamethylene, 2-methyl trimethylene, 2,2-dimethyltrimethylene, hexamethylene and decamethylene glycols; dihydroxy cyclohexane; cyclohexane dimethanol; resorcinol; hydroquinone; 1,5-dihydroxy naphthalene, 2-octyl undecanediol or mixtures of any one or more of these diols with unsaturated diols such as butene-diol, hexene-diol, etc. Especially preferred are saturated aliphatic diols, mixtures thereof or a mixture of a saturated diol(s) with an unsaturated diol(s), each diol containing 2–8 carbon atoms. Included among the aromatic dihydroxy compounds which can be used are 4,4' dihydroxy diphenyl, bis(p-hydroxyphenyl)methane, and 2,2-bis(p-hydroxyphenyl)propane. Equivalent ester-forming derivatives of diols are also useful (e.g., ethylene oxide or ethylene carbonate can be used in place of ethylene glycol).

Where more than one diol is employed, it is preferred that at least about 60 mole %, based on the total diol content, be the same diol, most preferably at least 80 mole %. The preferred polyesters are those in which 1,4-butanediol is present in a predominant amount, most preferably when 1,4-butanediol is the only diol.

Dicarboxylic acids suitable for use in preparing the polyester block are the $C_6$ to $_{20}$ aromatic dicarboxylic acids, the esters thereof and the equivalent ester-forming derivatives thereof, including for example the acid halides and anhydrides, provided the number of carbons refers only to the acid itself.

As the term is used herein, aromatic dicarboxylic acids are dicarboxylic acids having two carboxyl groups attached to a carbon atom in an isolated or fused benzene ring system. It is not necessary that both functional carboxyl groups be attached to the same aromatic ring and where more than one ring is present, they can be joined by aliphatic or aromatic divalent radicals or divalent radicals such as —O— or —$SO_2$—. Preferred aromatic dicarboxylic acids include for example terephthalic acid, isophthalic acid, phthalic acid, napthalene-2,6-dicarboxylic acid, napthalene-1,5-dicarboxylic acid naphthalene-2,7-dicarboxylic acid, oxybis(benzoic acid), 4,4-sulfonyl dibenzoic acid and halo and $C_1$ to $C_{12}$ alkyl, alkoxy and aryl ring substitution derivatives thereof.

Finally, where mixtures of dicarboxylic acids are employed in the preparation of the aromatic polyesters, it is preferred that at least about 60 mole %, preferably at least about 80 mole %, based on 100 mole % of dicarboxylic acid, be of the same dicarboxylic acid or ester derivative thereof. The preferred aromatic polyesters are those in which dimethylterephthalate is the predominant dicarboxylic acid, most preferably when dimethylterephthalate is the only dicarboxylic acid.

Optionally, the aromatic polyesters may contain a minor amount, generally less than 20 mole percent, preferably less than 10 mole percent, based on the dicarboxylic acid(s), of a $C_4$ to $C_{16}$ aliphatic and/or cycloaliphatic dicarboxylic acid. Exemplary of the aliphatic and cycloaliphatic dicarboxylic acid there may be given glutaric acid, adipic acid, azelaic acid, succinic acid, 1,4-cyclohexane dicarboxylic acid, tetramethyl succinic acid and cyclopentane dicarboxylic acid.

These aromatic polyesters (a) may be prepared in a separate step prior to polymerization of the block copolymers of the present invention or the reactants therefore may be directly added to the reaction vessel with the poly(alkylene ether)glycol (b) and/or dimer ester (c) and polymerized during the overall polymerization process. If a prepolymer or preformed aromatic polyester is to be used, they may be prepared by conventional processes as described in, for example, U.S. Pat. Nos. 2,465,319; 3,047,539 and 2,910,466, herein incorporated by reference. Preferred aromatic polyester prepolymers will generally have an intrinsic viscosity of at least about 0.2 dl/g, most preferably at least about 0.3 dl/g as measured in a 60:40 phenol/tetrachlorethane mixture. Of course, lower intrinsic viscosity polyesters will also be suitable.

Preferred aromatic polyesters are of the formula:

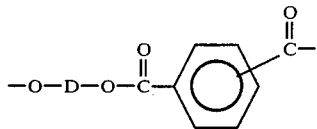

where D is a $C_2$ to $C_8$ organic radical remaining after removal of the terminal hydroxy groups of an aliphatic or cycloaliphatic diol. Especially preferred aromatic polyesters are poly(butylene terephthalate), poly(butylene terephthalate-co-isophthalate) and poly(ethylene terephthalate), most preferably poly(butylene terephthalate).

Poly(alkylene ether)glycols (b) suitable for use in the prepartion of the block copolymer of the present invention will generally have a molecular weight of from about 350 to about 12000, preferably from about 900 to about 4000. Additionally, they will generally have a carbon-to-oxygen ratio of from about 1.8 to about 4.3.

Representative of the long chain poly(alkylene ether)glycols that may be used, there may be given poly(ethylene ether)glycol; poly(propylene ether)glycol; poly(tetramethylene ether)glycol; random or block copolymers of ethylene oxide and propylene oxide, including propylene oxide terminated poly(ethylene ether)glycol; and random or block copolymers of tetrahydrofuran with minor amounts of a second monomer such as ethylene oxide, propylene oxide and methyl tetrahydrofuran. Polyformal glycols prepared by reacting formaldehyde with diols such as 1,4-butanediol and 1,5-pentanediol are also useful. Especially preferred poly(alkylene ether)glycols are poly(propylene ether)glycol, poly(tetramethylene ether)glycol and poly(ethylene ether)glycols end capped with poly(propylene ether)glycol and/or propylene oxide.

While copolyetheresters prepared from the foregoing components have good melting and crystallization characteristics, their elastomeric properties are only fair. Modification thereof by substituting dimer acid for some of the dicarboxylic acid and/or poly(alkylene ester) results in random copolyetheresters having good elastomeric properties but poorer melt and crystallization temperatures and characteristics. Applicant has now surprisingly found that a dimer ester oligomer or polymer when incorporated as a block segment in a ternary block-copolymer manifests unexpectedly improved melt and crystallization temperatures and characteristics as well as unexpectedly and markedly improved compression set. In general, these compositions have excellent molding characteristics and stress-strain elastomeric properties.

The dimer ester oligomers and polymers suitable for providing the unexpectedly improved properties of the present invention are the esterification/polycondensation reaction product of one or more diols and dimer acid. Diols suitable for the preparation of the dimer ester oligomer or polymer block are as described above for the preparation of the aromatic polyester (a). Preferred diols are the aliphatic diols including for example ethylene glycol; 1,4-butanediol; 1,6-hexanediol; neopentyl glycol and 2-octyl-undecanediol.

Dimer acids useful in the preparation of the dimer ester oligomer and/or polymer block are prepared by the dimerization of unsaturated fatty acids of 18 carbons. Exemplary of fatty acids from which they are prepared there may be given oleic acid, linoleic acid and linolenic acid. The preparation and structure of dimer acid is described in Journal of the American Oil Chemists Society, 39, 534–545 (1962), Journal of the American Chemical Society 66, 84 (1944) and U.S. Pat. No. 2,347,562, all incorporated herein by reference. Suitable dimer acids may be employed in their unhydrogenated or hydrogenated form and include the acid functioning derivatives thereof.

Several grades of dimer acid are available commercially which vary in monomer and trimer content. Inclusive of suitable commercial dimer acids there may be given those available from Emery Industries under the tradenames EMPOL 1010 (a hydrogenated dimer acid) and EMPOL 1014. EMPOL 1010 is reported as typically containing 97% dimer acid, 3% trimer acid and essentially no monobasic acid and extremely low unsaturation, whereas EMPOL 1014 is typified as containing 95%, 4% and 1% of dimer, trimer and monobasic acids respectively. Also available are the dimer acids sold under the tradename HYSTRENE from the Humko Products Division of Witco Chemical Corporation, especially HYSTRENE 3695 which typically contains 95% dimer acid and a weight ratio of dimer to trimer of 36:1. Preferred grades are substantially free of such monomer and trimer fractions, most preferably less than 5% by weight, and are fully saturated, or substantially so. Where desirable, the dimer acid member may be substantially freed of monomer and trimer fractions by molecular distillation or other suitable means. Finally, an additional source of suitable dimer acids is the Henkel Corporation. As with the foregoing sources, Henkel dimer acids are available in unhydrogenated and hydrogenated versions. Preferred dimer acids for the purpose of the present invention are the hydrogenated $C_{36}$ dimer acids.

The dimer ester prepolymers are prepared by conventional esterification processes as mentioned above for the aromatic polyesters (a). In general, it is preferred that the degree of polymerization of the dimer ester oligomer or polymer be such as to provide a prepolymer having a Brookfield viscosity of at least about 10,000 centipoise, preferably at least about 20,000 centipoise, as measured at 60° C. with a No. 6 spindle. Of course it is anticipated that lower viscosity polyesters will be useful herein and are thus intended within the full scope of the present invention. For example, applicant believes the invention is applicable to dimer ester oligomers of MW of at least about 1200, preferably at least about 1500.

The block copolymers of the present invention will generally comprise from about 40 to about 90 percent by weight of the aromatic polyester blocks (a), from about 5 to about 60 percent by weight of long chain poly(alkylene ether) blocks (b) and from about 2 to about 30 percent by weight of dimer ester oligomer or polymer blocks (c). Preferred compositions will comprise from about 60 to about 80 percent by weight of (a), from about 15 to about 40 percent by weight of (b) and from about 5 to about 15 percent by weight of (c).

The block copolymers described herein may be made conveniently by conventional ester interchange reactions. Exemplary of the processes that may be used are as set forth in, for example, U.S. Pat. Nos. 3,023,192; 3,763,109; 3,663,653 and 3,801,547, herein incorporated by reference, as well as those already referred to above. Typically, the aromatic polyester (a), long chain poly-(alkylene ether)glycol (b) and the dimer ester oligomer and/or polymer (c) is heated to about 150° C. to 260° C. at about atmospheric pressure while distilling off volatiles. Depending upon temperature, catalyst, excess diol and degree of hydroxy end capping of the aromatic polyester (a), this stage of polymerization is complete within a few minutes to a few hours. This procedure results in the preparation of a low intrinsic viscosity copolymer which can be carried to a high molecular weight (high intrinsic viscosity, e.g. greater than about 0.6, preferably greater than about 0.8) copolyester by polycondensation. During polycondensation, excess diol in the system as well as diol end caps on the low molecular weight prepolymer are distilled off. Additional ester interchange occurs during this distillation to increase the molecular weight of the polymer and to randomize the arrangement of the individual block units. During polycondensation, the temperatures of the reaction system is elevated to between about 240° C. and 300° C. and the pressure decreased to less than about 670 Pa, more preferably less than about 250 Pa.

Alternatively, as mentioned above, the reactants for the aromatic polyester (a) may be charged to the system along with the long chain poly(alkylene ether)glycol (b) and dimer ester oligomer and/or polymer (c). In this instance, the long chain poly(alkylene ether)glycol and dimer ester oligomer or polymer together with the dicarboxylic acid(s) or methylester(s) thereof and a molar excess, as compared to the acid, of the diol(s) are changed into the reaction vessel and heated at 150° to 260° C. Heating is continued until methanol and/or water evolution is substantially complete. Again depending upon temperature, catalyst and diol excess, this polymerization is complete within a few minutes to a few hours. The prepolymer as produced is then carried to a high molecular weight copolymer by polycondensation as described above.

While not required, it is customary and preferred to utilize a catalyst or catalyst system in the process for the production of the block copolyesters of the present invention, as well as for the preparation of the aromatic polyester (a) and dimer ester oligomer and/or polymer (c) preformed blocks. In general, any of the known ester-interchange and polycondensation catalysts may be used. Although two separate catalysts or catalyst systems may be used, one for ester interchange and one for polycondensation, it is preferred, where appropriate, to use one catalyst or catalyst system for both. In those instances where two separate catalysts are used, it is preferred and advantageous to render the ester-interchange catalyst ineffective following the completion of the precondensation reaction by means of known catalyst inhibitors or quenchers, in particular, phosphorus compounds such as phosphoric acid, phosphenic acid, phosphonic acid and the alkyl or aryl esters or salts thereof, in order to increase the thermal stability of the resultant polymer.

Exemplary of the suitable known catalysts there may be given the acetates, carboxylates, hydroxides, oxides, alcoholates or organic complex compounds of zinc, manganese, antimony, cobalt, lead, calcium and the alkali metals insofar as these compounds are soluble in the reaction mixture. Specific examples include, zinc acetate, calcium acetate and combinations thereof with antimony tri-oxide and the like. These catalysts as well as additional useful catalysts are described in U.S. Pat. Nos. 2,465,319; 2,534,028; 2,850,483; 2,892,815; 2,937,160; 2,998,412; 3,047,539; 3,110,693 and 3,385,830, among others, incorporated herein by reference.

Where the reactants and reactions allow, it is preferred to use the titanium catalysts including the inorganic and organic titanium containing catalysts, such as those described in, for example, U.S. Pat. No. 2,720,502; 2,727,881; 2 729,619; 2,822 348; 2,906,737; 3,047,515; 3,056,817; 3,056,818; and 3,075,952 among others, incorporated herein by reference. Especially preferred are the organic titanates such as tetra-butyl titanate, tetra-isopropyl titanate and tetra-octyl titanate and the complex titanates derived from alkali or alkaline earth metal alkoxides and titanate esters, most preferably the organic titanates. These too may be used alone or in combination with other catalysts such as for example, zinc acetate, calcium acetate, manganese acetate or antimony trioxide, and/or with a catalyst quencher as described above. The catalyst should be used in amounts of from about 0.005 to about 2.0 percent by weight based on the total reactants.

Both batch and continuous methods can be used for any stage of the block copolyester polymer preparation. Polycondensation of prepolymer can also be accomplished in the solid phase by heating finely divided solid prepolymer in a vacuum or in a stream of inert gas to remove liberated low molecular weight diol. This method has the advantage of reducing degradation because it must be used at temperatures below the softening point of the prepolymer. The major disadvantage is the long time required to reach a given degree of polymerization.

Although the copolyesters of this invention possess good resistance toward heat aging and photodegradation, it is advisable to stabilize these compositions by incorporating antioxidants in the copolyester compositions.

Most any oxidative and/or thermal stabilizer known in the art for copolyetheresters may be used in the practice of the present invention. These can be incorporated into the compositions either during polymerization or while in a hot melt stage following polymerization. Satisfactory stabilizers include the phenols and their derivatives, amines and their derivatives, compounds containing both hydroxyl and amine groups, hydroxyazines, oximes, polymeric phenolic esters and salts of multivalent metals in which the metal is in its lower valence state.

Representative phenol derivatives useful as stabilizers include 3,5-di-tert-butyl-4-hydroxy hydrocinnamic triester with 1,3,5-tris-(2-hydroxyethyl)-s-triazine-2,4,6-(1H,3H,5H)trione (Goodrite 3125); N,N'-hexamethylene-bis(3,5-di-tert-butyl-4-hydroxyhydrocinnamamide); 4,4'-bis(2,6-ditertiary-butylphenol); 1,3,5-trimethyl-2,4,6-tris(3,5-ditertiarybutyl-4-hydroxybenzyl)benzene and 4,4'-butylidenebis(6-tertiary-butyl-m-cresol). Various inorganic metal salts or hydroxides can be used as well as organic complexes such as nickel dibutyl dithiocarbonate, manganous salicylate and copper 3-phenyl-salicylate. Typical amine stabilizers include 4,4-bis($\alpha,\alpha$-dimethylbenzyl) diphenylamine, N,N'-bis(betanaphthyl)-p-phenylene diamine; N,N'-bis(1-methylheptyl) -p-phenylene diamine and either phenyl-beta-naphthyl amine or its reaction products with aldehydes. Mixtures of hindered phenols with esters of thiodipropionic acid, mercaptides and phosphite esters are particularly useful. Additional stabilization to ultraviolet light can be obtained by compounding with various UV absorbers such as substituted benzophenones and/or benzotriazoles.

Further, the properties of these polyesters can be modified by incorporation of various conventional inorganic fillers such as carbon black, silica gel, alumina, clays and chopped fiberglass. These may be incorporated in amounts up to 50% by weight, preferably up to about 30% by weight. In general, these additives have the effect of increasing the modulus of the material at various elongations.

DETAILED DESCRIPTION OF THE PREFERRED EMBODIMENTS

The following examples are presented as illustrative of the present invention and are not to be construed as limiting thereof.

Compression set properties were determined in accordance with ASTM395B at 25° C. and 70° C. for a period of 22 hours.

Examples 1–13, Comparative Examples A–G

A series of block copolymers within the scope of the present invention as well as comparative random copolymers outside the scope of the present invention were prepared. In each of these examples, the reactants for the aromatic polyester (a) were charged into the reactor vessel along with the long chain ether glycol and the preformed dimer ester polymer.

Typically, the compositions of these examples were prepared by adding to the reactor vessel dimethyl terephthalate; a molar excess, as compared to the terephthalate, of butanediol; poly(tetramethylene ether)-glycol (Polymeg-molecular weight 1000 and 2000); and the dimer ester polymer or, in the case of the comparative examples, the reactants therefore, along with Goodite 3125 stabilizer and a titanate ester catalyst. The reaction mixture was heated from 165° C. to 240° C. for a sufficient amount of time until approximately the theoretical amount of methanol was generated. A vacuum was then applied to build a high molecular weight, high viscosity block copolymer. Reaction times were generally about 3 hours at 250° C. under 0.5 mmHg vacuum.

The compositions of the block copolymers and the comparative random copolymers as well as the physical characteristics thereof were as presented in Table I. In each of the comparative examples, the amount by which the dimer ester reactants were added to the reaction mix was equivalent to that amount necessary to prepare the amount of preformed dimer ester polymer.

These examples and comparative examples demonstrate various dimer ester polymers; various weight ratios of the aromatic polyester block(s), the long chain ether glycol blocks(s) and the dimer ester polymer blocks(s), as well as various long chain ether glycols. These examples and comparative examples as well as the results obtained are as set forth in Table I.

TABLE I

| Example | PBT % | Polymeg MW | Polymeg % | Dimer Ester Block Diol | Dimer Ester Block Viscosity[a] | Dimer Ester Block % | Copolymer Tm[b] | Copolymer Tc[c] | Copolymer IV[d] | Copolymer @ 25° C.[e] | Copolymer @ 70° C.[e] |
|---|---|---|---|---|---|---|---|---|---|---|---|
| 1 | 63.1 | 1000 | 31.7 | ethylene glycol | 81,600 | 5.2 | 194 | 148 | 1.02 | 18 | 48 |
| A | " | " | " | " | — | " | 194 | 143 | 1.00 | 23 | 54 |
| 2 | " | 2000 | " | butanediol | 168,000 | " | 206 | 147 | 1.01 | 24 | 55 |
| B | " | " | " | " | — | " | 204 | 143 |  | 28 | 59 |
| C | 65 | 2000 | 35 | — | — | — | 206 |  | 1.10 | 40 | 73 |
| 3 | 63.1 | 1000 | 31.7 | hexanediol | 155,000 | 5.2 | 191 | 147 | 1.05 | 24 | 57 |
| D | " | " | " | " | — | " | 192 | 137 | 1.08 | 33 | 61 |
| 4 | 60.0 | 2000 | 30.1 | " | 155,000 | 9.9 | 195 | 144 | 0.94 |  |  |
| E | 60.0 | " | 30.1 | " | — | " | 178 | 128 | 0.85 |  |  |
| 5 | 63.1 | 2000 | 31.7 | " | 155,000 | 5.2 | 201 | 159 | 1.07 | 23 | 57 |
| 6 | 79.8 | " | 15 | " | 84,800 | " | 206 | 156 | 0.98 |  |  |
| 7 | 54.8 | " | 40 | " | 69,200 | " | 198 | 141 | 1.07 |  |  |
| 8 | 63.1 | " | 31.7 | neopentyl glycol | 36,800 | " | 202 | 155 | 1.10 | 23 | 47 |
| F | " | " | " | " | — | " | 201 | 150 | 1.04 | 32 | 54 |
| 9 | " | " | " | 2-octyl undecane diol | 150,400 | " | 201 | 146 | 0.94 |  |  |
| 10 | " | 1000 | " | 2-octyl undecane diol | 40,000 | " | 192 | 140 | 0.94 | 27 | 60 |
| G | " | 1000 | " | 2-octyl undecane diol | — | " | 188 | 140 | 1.03 | 28 | 61 |
| 11 | 57.1 | 2000 | 28.6 | 2-octyl undecane diol | 150,000 | 14.3 | 185 |  | 1.09 |  |  |
| 12 | " | " | " | 2-octyl undecane diol | 19,000 | " | 185 |  | 0.94 |  |  |
| 13 | " | " | " | hexanediol | 46,400 | " | 185 | 122 | 1.11 | 23 | 53 |
| H | " | " | " | " | — | " | 185 | 120 | 1.15 | 26 | 57 |

TABLE I-continued

| Example | PBT % | Polymeg MW | % | Dimer Ester Block Diol | Viscosity[a] | % | Copolymer Tm[b] | Tc[c] | IV[d] | @ 25° C.[e] | @ 70° C.[e] |
|---|---|---|---|---|---|---|---|---|---|---|---|
| 14 | 63.1 | " | 31.7 | " | 51,200 | 5.2 | 201 | 151 | 1.17 | 14 | 39 |

[a]Viscosity is expressed as Brookfield Viscosity in centipoise as determined at 60° C. with a No. 6 spindle.
[b]Melting temperature of resultant copolymer.
[c]Crystallization temperature of resultant copolymer.
[d]Intrinsic Viscosity of resultant copolymer expressed in dl/g as determined in a 60:40 phenol/tetrachloroethane mixture.
[e]Compression set at 25° C. as determined by ASTM 395B.

From Table I it is clear that the dimer ester block modified block copolyetheresters of the present invention have generally improved melt temperatures, crystallization temperatures and/or compression sets as compared to unmodified and dimer modified random copolyetheresters. These findings are fairly consistent at various dimer ester and poly(tetramethylene ether)-glycol (Polymeg) loadings and with the use of various molecular weight polymegs and various dimer esters. From examples 10 and G, it is apparent that with the higher molecular weight diols, the difference in compression set is less clear, as compared to, for example, examples 1 and A and 3 and D, however, the benefits of the present invention are still present.

Comparison of examples 2, B and C demonstrates the benefit of the present invention most clearly. Specifically, the unmodified copolyetherester (c) has excellent melt and crystallization temperatures, but very poor compression set. Dimer modified random copolyester B has good compression set but loses melt temperature and crystallization temperature. However, unexpectedly, the block copolymers of the present invention, Example 2, retains the high melt and crystallization temperatures of the unmodified copolyetherester yet has even better compression set than the dimer modified copolyetherester. Additionally, the compositions of the present invention had excellent shore D hardness, Bayshore resilience and other elastomeric stress-strain characteristics. Thus the compositions of the present invention have greater utility and better properties than the prior art compositions.

EXAMPLE 14

An additional block copolymer of the present invention was prepared by way of a two pot reaction. Initially, a low molecular weight dimer ester polymer was prepared from hexanediol and dimer acid. Concurrently in a second reactor, a low molecular weight (IV about 0.65) poly(butylene terephthalate) was prepared from dimethylterephthalate and 1,4-butanediol with a titanate ester catalyst. In each system the reactants were heated from 160° C. to about 240° C. until the theoretical amount of volatiles and/or water was removed. Vacuum was then applied to the system for about 1.5 hours at 1 mmHg. At this point the vacuums were broken and polymeg 2000 and the dimer ester polymer added to the poly(butylene terephthalate) reactor along with Goodite 3125 stabilizer and additional titanate ester catalyst. Vacuum was reapplied and the reaction held at 250° C. and 0.5 mmHg for about 3 hours. The resultant polymer had the properties set forth in Example 14, Table 1. Comparison of Example 14 with Example 5 demonstrates the even greater compression set of the triblock copolymer wherein the aromatic polyester is preformed prior to polymerization of the block copolyester ether.

Obviously, other modifications will suggest themselves to those skilled in the art in light of the above, detailed description. All such modifications are within the full intended scope of the present invention as defined by the appended claims.

I claim:

1. A thermoplastic elastomeric block copolyether ester comprising the reaction product of
   (a) at least one $C_2$ to $C_{20}$ diol,
   (b) at least one $C_6$ to $C_{20}$ aromatic dicarboxylic acid,
   (c) at least one poly(alkylene ether)glycol having a molecular weight of from about 350 to about 12000 and
   (d) a property improving amount of a dimer ester polymer sufficient to improve compression set.

2. The composition of claim 1 wherein the diol is selected from $C_2$ to $C_{20}$ aliphatic and cycloaliphatic diols and wherein at least 60 mole percent of the diol is the same.

3. The composition of claim 1 wherein the diol is selected from the group consisting of $C_2$ to $C_8$ aliphatic diols and wherein at least 80 mole % of the diol is the same.

4. The composition of claim 3 wherein the diol is 1,4-butanediol.

5. The composition of claim 1 wherein the diol is 1,4-butane diol.

6. The composition of claim 1 wherein the aromatic dicarboxylic acid is a $C_6$ dicarboxylic acid or the $C_8$ ester derivative thereof and at least 60 mole % of the acid is the same.

7. The composition of claim 1 wherein the aromatic dicarboxylic acid is a $C_6$ dicarboxylic acid or the $C_8$ ester derivative thereof and at least 80 mole % of the acid is the same.

8. The composition of claim 7 wherein the aromatic dicarboxylic acid is dimethylterephthalate.

9. The composition of claim 1 wherein the aromatic dicarboxylic acid is dimethylterephthalate.

10. The composition of claim 1 wherein reactants (a) and (b) are prereacted to form a low molecular weight polyester prior to polymerization of the composition.

11. The composition of claim 10 wherein the preformed low molecular weight polyester is represented by repeating units of the formula:

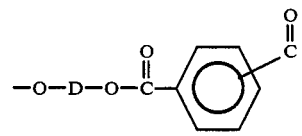

where D is a $C_2$ to $C_8$ organic radical remaining after removal of the terminal hydroxy groups of an aliphatic or cycloaliphatic diol.

12. The composition of claim 11 wherein the preformed low molecular weight polyester is poly(butylene terephthalate).

13. The composition of claim 1 wherein the poly(alkylene ether)glycol has a molecular weight of from about 900 to about 4000.

14. The composition of claim 13 wherein the poly(alkylene ether)glycol is selected from the group consisting of poly(propylene ether)glycol, poly(tetramethylene ether)glycol and copoly(propylene ether-ethylene ether)glycol.

15. The composition of claim 13 wherein the poly(alkylene ether)glycol is poly(tetramethylene ether)glycol.

16. The composition of claim 1 wherein the dimer ester polymer is derived from a $C_2$ to $C_{20}$ aliphatic or cycloaliphatic diol and a dimer acid.

17. The composition of claim 1 wherein the dimer ester polymer is derived from a $C_2$ to $C_6$ aliphatic diol and dimer acid.

18. The composition of claim 1 wherein the block copolymer comprises from about 40 to about 90 parts by weight of polyester units derived from (a) and (b), from about 5 to about 60 part by weight of poly(alkylene ether) units derived from (c) and from about 2 to about 30 parts by weight of dimer ester polymer units derived from (d).

19. The composition of claim 1 wherein the block copolymer comprises from about 60 to about 80 parts by weight of polyester units derived from (a) and (b), from about 15 to about 40 parts by weight of poly(alkylene ether) units derived from (c) and from about 5 to about 15 parts by weight of dimer ester polymer units derived from (d).

20. A thermoplastic elastomeric composition comprising the reaction product of
   (a) butanediol
   (b) dimethylterephthalate
   (c) poly(tetramethylene glycol) and
   (d) a dimer ester polymer derived from a $C_2$ to $C_{20}$ diol and dimer acid.

* * * * *